United States Patent
Young et al.

(10) Patent No.: US 10,333,177 B2
(45) Date of Patent: Jun. 25, 2019

(54) ELECTROLYTES AND METAL HYDRIDE BATTERIES

(71) Applicants: BASF Corporation, Florham Park, NJ (US); Wayne State University, Detroit, MI (US)

(72) Inventors: Kwo Young, Troy, MI (US); Shuli Yan, Detroit, MI (US); Simon K. Y. Ng, West Bloomfield, MI (US)

(73) Assignee: BASF Corporation, Florham Park, NJ (US)

( * ) Notice: Subject to any disclaimer, the term of this patent is extended or adjusted under 35 U.S.C. 154(b) by 223 days.

(21) Appl. No.: 14/540,174

(22) Filed: Nov. 13, 2014

(65) Prior Publication Data

US 2016/0141722 A1    May 19, 2016

(51) Int. Cl.
  *H01M 10/26* (2006.01)
  *H01M 4/38* (2006.01)
  *H01M 10/34* (2006.01)

(52) U.S. Cl.
  CPC ........... *H01M 10/26* (2013.01); *H01M 4/383* (2013.01); *H01M 10/345* (2013.01); *H01M 2300/0014* (2013.01)

(58) Field of Classification Search
  None
  See application file for complete search history.

(56) References Cited

U.S. PATENT DOCUMENTS

| | | | |
|---|---|---|---|
| 5,455,125 A | 10/1995 | Matsumoto et al. | |
| 5,616,432 A * | 4/1997 | Ovshinsky | C01B 3/0031 216/108 |
| 5,637,422 A * | 6/1997 | Edamoto | H01M 2/1229 429/202 |
| 6,074,785 A | 6/2000 | Dansui et al. | |
| 6,475,664 B1 | 11/2002 | Kawakami et al. | |
| 2001/0012586 A1 * | 8/2001 | Hong | H01M 4/0445 429/223 |

FOREIGN PATENT DOCUMENTS

| | | | | |
|---|---|---|---|---|
| JP | S62291869 | * | 12/1987 | ............ H01M 10/24 |
| JP | H 07211344 | * | 8/1995 | ............ H01M 10/26 |
| JP | 09-213318 A | | 8/1997 | |
| JP | H 09213318 | * | 8/1997 | ............ H01M 10/30 |
| JP | 10-289717 A | | 10/1998 | |

OTHER PUBLICATIONS

English translation of JPH 09213318 (1997).*
English translation of JPS62291869 (1987).*
English translation of JPH 07211344 (Year: 1995).*
Copending U.S. Appl. No. 14/540,445, filed Nov. 13, 2014.
English language abstract of JP 09-213318 Aug. 15, 1997.
International Search Report dated Feb. 29, 2016.
Written Opinion dated Feb. 29, 2016.
Machine translation of JP09-213318 Aug. 15, 1997.

* cited by examiner

*Primary Examiner* — Yoshitoshi Takeuchi
(74) *Attorney, Agent, or Firm* — Dinsmore & Shohl LLP; Weston R. Gould

(57) ABSTRACT

Metal hydride batteries comprising an electrolyte composition which comprises an aqueous solution comprising potassium hydroxide (KOH) and one or more halide and/or oxyacid salts exhibit reduced degradation of the anode material during operation. The salts are for instance alkali metal salts. Anode materials exhibit for instance <100 % of the degradation of the same anode material in the same battery when replacing the electrolyte composition with 30 weight percent (wt %) aqueous KOH and the conductivity of the electrolyte composition is for instance ≥85 % of 30 wt % aqueous KOH. Anode materials are for example ABx high capacity hydrogen storage alloys comprising Mg where x is from about 0.5 to about 5 and which has a discharge capacity of ≥400 mAh/g.

8 Claims, No Drawings

ELECTROLYTES AND METAL HYDRIDE BATTERIES

GOVERNMENT SUPPORT STATEMENT

This invention was made with government support under DE-AR0000386 awarded by Advanced Research Projects Agency-Energy under the Robust Affordable Next Generation EV Storage Program (RANGE). The government has certain rights in the invention.

The present invention is aimed at metal hydride (MH) batteries containing certain electrolyte compositions.

BACKGROUND

Much progress has been made in optimizing the electrochemical performance and cycle life of metal hydride batteries (cells) through optimization of the electrodes. The electrolyte of metal hydride batteries is presently 30% by weight aqueous KOH. The aqueous KOH electrolyte is corrosive to many anode materials. The present invention is focused on improved electrolytes for metal hydride batteries.

SUMMARY

Disclosed is a metal hydride battery (cell) comprising at least one negative electrode comprising an active anode material, at least one positive electrode comprising an active cathode material, a casing having said electrodes positioned therein and an electrolyte composition, where the electrolyte composition comprises an aqueous solution comprising potassium hydroxide (KOH) and one or more salts selected from the group consisting of halide salts and oxyacid salts.

DETAILED DISCLOSURE

The electrolyte composition is useful in a metal hydride battery (metal hydride cell). A metal hydride battery comprises at least one negative electrode, at least one positive electrode, a casing having said electrodes positioned therein and an electrolyte composition in contact with the electrodes.

The active material of the negative electrode (anode material) comprises an ABx type alloy capable of storing hydrogen where x is from about 0.5 to about 5. A is a hydride forming element and B is a weak or non-hydride forming element. The alloys are capable of reversibly absorbing and desorbing hydrogen.

The ABx type alloys are for example of the categories (with simple examples): AB (HfNi, TiFe, TiNi), $AB_2$ ($Mn_2Zr$, $TiFe_2$), $A_2B$ ($Hf_2Fe$, $Mg_2Ni$), $AB_3$ ($NdCo_3$, $GdFe_3$), $A_2B_7$ ($Pr_2$, $Ni_7$, $Ce_2Co_7$) and $AB_5$ ($LaNi_5$, $CeNi_5$).

For example, the anode active material comprises Zr, Mn, V, Fe and Ni; Zr, Mn, V, Co and Ni; Ti, V and Ni; La and Ni; Ti, Zr, Ni, Cr and one or more elements selected from the group consisting of Al, Si, V, Mn, Fe, Co, Cu, Nb, Ag and Pd; Zr, Mo and Ni; or a lanthanide metal and at least one metals selected from Ni and Co.

The anode material may comprise a disordered multi-component material comprising one or more host elements selected from the group consisting of V, Zr, Nb, La, Si, Ca, Sc, Mg, Ti and Y and one or more modifier elements selected from the group consisting of Cu, Mn, C, Fe, Ni, Al, Co, Mo, W, Ti, Li and Re. The host elements are in general hydride formers. For instance, the host matrix is one or more of Ti, Mg and V and the modifier includes one or more of Ni, Cu, Fe and Al. Such disordered materials are taught in U.S. Pat. No. 4,623,597.

The anode material may comprise a multi-component, multi-phase alloy comprising V, Ti, Zr and Ni or V, Ti, Zr, Ni and Cr and one or more modifying elements selected from the group consisting of Al, Mn, Mo, Cu, W, Fe and Co. Such multi-phase materials are taught in U.S. Pat. No. 5,096,667.

The anode material may comprise disordered material comprising (base alloy)$_a$Co$_b$Mn$_c$Fe$_d$Sn$_e$ where base alloy comprises from 0.1 to 60 atomic percent (at %) Ti, 0.1 to 40 at % Zr, 0 to 60 at % V, 0.1 to 57 at % Ni and 0 to 56 at % Cr; b is 0 to 7.5 at %, c is 13 to 17 at %, d is 0 to 3.5 at %, e is 0 to 1.5 at % where a, b, c, d and e equal 100 at %. Such alloys are disclosed in U.S. Pat. No. 5,536,591.

The anode active material is for instance a $LaNi_5$ type alloy, a modified $LaNi_5$ type alloy, a TiNi type alloy or a modified TiNi type alloy. For example, the anode active material comprises one or more elements selected from the group consisting of Ti, V and Zr and one or more elements selected from the group consisting of Ni, Cr, Co, Mn, Mo, Nb, Fe, Al, Mg, Cu, Sn, Ag, Zn and Pd; or the anode active material comprises one or more elements selected from the group consisting of Sc, Y, La, Ce, Pr, Nd, Sm and Mm and one or more elements selected from the group consisting of Ni, Cr, Co, Mn, Fe, Cu, Sn, Al, Si, B, Mo, V, Nb, Ta, Zn, Zr, Ti, Hf and W. Such alloys may further include one or more glass forming elements selected from the group consisting of Al, B, C, Si, P, S, Bi, In and Sb. Such materials advantageously are disordered, multi-component materials having a density of hydrogen storage sites of greater than 1.2 E23/cc or greater than 1.5 E23/cc. Such material are disclosed in U.S. Pat. No. 5,840,440.

The anode material may comprise a modified Ti—V—Zr—Ni—Mn—Cr alloy comprising (base alloy)$_a$Co$_b$Fe$_c$Al$_d$Sn$_e$, where base alloy comprises from 0.1 to 60 at % Ti, 0.1 to 40 at % Zr, 0 to 60 at % V, 0.1 to 57 at % Ni, 5 to 22 at % Mn and 0 to 56 at % Cr, b is 0.1 to 10 at %, c is 0 to 3.5 at %, d is 0.1 to 10 at %, e is 0.1 to 3 at %. Suitable materials are taught in U.S. Pat. No. 6,270,719.

Suitable anode materials may comprise $AB_2$ type alloys, such as a modified $TiMn_2$ alloy comprising 2 to 5 at % Zr, 26 to 33 at % Ti, 7 to 13 at % V, 8 to 20 at % Cr, 36 to 42 at % Mn and one or more of 1 to 6 at % Ni, 2 to 6 at % Fe and 0.1 to 2 at % Al. The alloys may further contain up to 1 at % Mm. For instance $Zr_{3.63}Ti_{29.8}V_{8.82}Cr_{9.85}Mn_{39.5}Ni_{2.0}Fe_{5.0}Al_{1.0}Mm_{0.4}$; $Zr_{3.6}Ti_{29.0}V_{8.9}Cr_{10.1}Mn_{40.1}Ni_{2.0}Fe_{5.1}Al_{1.2}$; $Zr_{3.6}Ti_{28.3}V_{8.8}Cr_{10.0}Mn_{40.7}Ni_{1.9}Fe5_{0.1}Al_{1.6}$ and $Zr_1Ti_{33}V12._{54}Cr_{15}Mn_{36}Fe_{2.25}Al_{0.21}$. Such alloys are disclosed in U.S. Pat. No. 6,536,487.

Suitable anode materials may comprise alloys where $A_5B_{19}$ type structures are 40 at % or more of the alloy of formula La$_a$R$_{1-a-b}$Mg$_b$Ni$_{c-d-e}$ where 0≤a≤0.5 at %, 0.1≤b≤0.2 at %, 3.7≤c≤3.9 at %, 0.1≤d≤0.3 and 0≤d≤0.2. These alloys are taught for instance in U.S. Pat. No. 7,829,220.

The anode material may comprise hydrogen-absorbing alloy particles containing at least Ni and a rare earth. The particles may have a surface layer and an interior where the surface layer has a nickel content greater than that of the interior and nickel particles having a size of from 10 nm to 50 nm are present in the surface layer. The material may comprise an alloy Ln$_{1-x}$Mg$_x$Ni$_{a-b-c}$Al$_b$Z$_c$, where Ln is one or more rare earth elements, Z is one or more of Zr, V, Bn, Ta, Cr, Mo, Mn, Fe, Co, Ga, Zn, Sn, In, Cu, Si, P and B, $0.05 \leq x \leq 0.3$ at %, $2.8 \leq a \leq 3.9$ at %, $0.05 \leq b \leq 0.25$ at % and $0.01 \leq c \leq 0.25$. These materials are taught for example in U.S. Pat. No. 8,053,114.

The anode material may comprise a crystalline structure having a multiple phases containing at least an $A_2B_7$ type structure and a $A_5B_{19}$ type structure and a surface layer having a nickel content greater than that of the bulk. The alloys may be of formula $Ln_{1-x}Mg_xNi_{y-a-b}Al_aM_b$, where Ln is one or more rare earths including Y, M is one or more of Co, Mn and Zn, where $0.1 \leq x \leq 0.2$ at %, $3.5 \leq y \leq 3.9$ at %, $0.1 \leq a \leq 0.3$ at % and $0 \leq b \leq 0.2$. Such materials are disclosed in U.S. Pat. No. 8,124,281.

The anode material may comprise a hydrogen storage alloy of formula $Ln_{1-x}Mg_x(Ni_{1-y}T_y)_z$ where Ln is one or more of lanthanide elements, Ca, Sr, Sc, Y, Ti, Zr and Hf, T is one or more elements selected from V, Nb, Ta, Cr, Mo, Mn, Fe, Co, Al, Ga, Zn, Sn, In, Cu, Si, P and B and where $0 < x \leq 1$ at %, $0 \leq y \leq 0.5$ at %, and $2.5 \leq z \leq 4.5$ at %. Suitable alloys are taught in U.S. Pat. No. 8,257,862.

The anode material may comprise La, Nd, Mg, Ni and Al; La, Nd, Mg, Ni, Al and Co; La, Pr, Nd, Mg, Ni and Al or La, Ce, Pr, Nd, Ni, Al, Co and Mn as taught in U.S. Pat. No. 8,409,753. The alloys are prepared for example by mixing the elements, heating in a high frequency induction furnace under argon to melt and cooling to form ingots.

The anode material may comprise a multi-phase alloy comprising an $AB_2$ type main phase and a second phase. The material is modified with a modifier element. For instance, the alloy comprises Ti, Zr, B, Ni and a modifier. The modifier may be a light rare earth such as Y. The alloy may be of formula $Ti_AZr_{B-X}Y_XV_CNi_DM_E$ where A, B, C and D are each greater than 0 and less than or equal to 50 at %, X is greater than 0 and less than or equal to 4 at %, M is one or more metals selected from Co, Cr, Sn, Al and Mn and E is from 0 to 30 at %. These materials are taught for example in U.S. Pub. No. 2013/0277607.

The anode material may comprise a modified $A_2B_7$ type hydrogen storage alloy. For instance an $A_xB_y$ alloy where A includes at least one rare earth element and also includes Mg; B includes at least Ni and the atomic ratio X to Y is from 1:2 to 1:5, for instance 1:3 to 1:4. The alloy may be modified by one or more elements selected from the group consisting of B, Co, Cu, Fe, Cr and Mn. The atomic ratio of Ni to modifier(s) may be from 50:1 to 200:1. The rare earths include La, Ce, Nd, Pr and Mm. The atomic ratio of rare earths to Mg may be from 5:1 to 6:1. The B elements may further include Al where the atomic ratio of Ni to Al may be from 30:1 to 40:1. The surface of the alloy may comprise catalytic metallic regions supported in a porous oxide support matrix. The catalytic metallic regions may be Ni or Ni alloy.

The anode material may be an ABx high capacity hydrogen storage alloy where x is from about 0.5 to about 5 and which has a discharge capacity of $\geq 400$ mAh/g, $\geq 425$ mAh/g, $\geq 450$ mAh/g or $\geq 475$ mAh/g.

The anode material is for instance a high capacity MH alloy containing magnesium (Mg), for example an AB, $AB_2$ or $A_2B$ type alloy containing Mg and Ni. For instance, present anode materials are MgNi, $MgNi_2$ or $Mg_2Ni$. Such Mg and Ni containing alloys may be modified by one or more elements selected from the group consisting of rare earth elements and transition metals. For instance, the anode materials containing Mg and Ni may be modified by one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

For instance, suitable anode materials comprise Mg and Ni and optionally one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

Mm is "mischmetal". Mischmetal is a mixture of rare earth elements. For instance, Mm is a mixture containing La, Nd and Pr, for instance containing Ce, La, Nd and Pr.

Magnesium-containing MH alloys are particularly susceptible to corrosion in a 30 weight percent (wt %) KOH electrolyte.

For example, suitable MH alloys include MgNi, $Mg_{0.8}Ti_{0.2}Ni$, $Mg_{0.7}Ti_{0.3}Ni$, $Mg_{0.9}Ti_{0.1}Ni$, $Mg_{0.8}Zr_{0.2}Ni$, $Mg_{0.7}Ti_{0.225}La_{0.075}Ni$, $Mg_{0.8}Al_{0.2}Ni$, $Mg_{0.9}Ti_{0.1}Ni$, $Mg_{0.9}Ti_{0.1}NiAl_{0.05}$, $Mg_{0.08}Pd_{0.2}Ni$, $Mg_{0.09}Ti_{0.1}NiAl_{0.05}$, $Mg_{0.09}Ti_{0.1}NiAl_{0.05}Pd_{0.1}$, $Mg_{50}Ni_{45}Pd_5$, $Mg_{0.85}Ti_{0.15}Ni_{1.0}$, $Mg_{0.95}Ti_{0.15}Ni_{0.9}$, $Mg_2Ni$, $Mg_{2.0}Ni_{0.6}Co_{0.4}$, $Mg_2Ni_{0.6}Mn_{0.4}$, $Mg_2Ni_{0.7}Cu_{0.3}$, $Mg_{0.8}La_{0.2}Ni$, $Mg_{2.0}Co_{0.1}Ni$, $Mg_{2.1}Cr_{0.1}Ni$, $Mg_{2.0}Nb_{0.1}Ni$, $Mg_{2.0}Ti_{0.1}Ni$, $Mg_{2.0}V_{0.1}Ni$, $Mg_{1.3}Al_{0.7}Ni$, $Mg_{1.5}Ti_{0.5}Ni$, $Mg_{1.5}Ti_{0.3}Zr_{0.1}Al_{0.1}Ni$, $Mg_{1.75}Al_{0.25}Ni$ and $(MgAl)_2Ni$, $Mg_{1.70}Al_{0.3}Ni$.

For example, present anode materials are alloys of Mg and Ni in an atomic ratio of from about 1:2 to about 2:1 which may be modified by one or more elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca. The modifying element or elements may be present from about 0.1 to about 30 atomic percent (at %) or from about 0.25 to about 15 at % or from about 0.5, about 1, about 2, about 3, about 4 or about 5 at % to about 15 at %, based on the total alloy. The atomic ratio of Mg to Ni is for instance about 1:1. Thus, Mg and Ni together may be present from about 70 at % to about 99.9 at % based on the total alloy in modified alloys. Mg—Ni alloys may be unmodified where Mg and Ni together are present at 100 at %.

Suitable anode materials comprise Mg and Ni in an atomic ratio of from about 1:2 to about 2:1 where Mg and Ni together are present at a level of $\geq 70$ at %, based on the total alloy.

Suitable anode materials for example are alloys that comprise $\geq 20$ at % Mg.

Suitable anode materials may comprise Mg and Ni in an atomic ratio of from about 1:2 to about 2:1 and further comprise Co and/or Mn. Suitable anode materials are for instance $Mg_{52}Ni_{39}Co_6Mn_3$ and $Mg_{52}Ni_{39}Co_3Mn_6$.

Suitable high capacity anode materials are disclosed for example in U.S. Pat. Nos. 5,616,432 and 5,506,069.

The alloys may be formed via melt spinning rapid solidification and/or mechanical alloying. Other methods include RF sputtering, laser ablation.

The active materials of the positive electrode (cathode materials) participate in the charge/discharge reactions. The active materials are for instance nickel hydroxide active materials, i.e. nickel hydroxide or modified nickel hydroxide.

The cathode materials may comprise a multi-phase disordered nickel hydroxide material having at least one modifier. The at least one modifier is for instance a metal, a metallic oxide, a metallic oxide alloy, a metal hydride and/or a metal hydride alloy. For example, the modifier is one or more components selected from the group consisting of Al, Ba, Ca, F, K, Li, Mg, Na, Sr, Bi, Co, Cr, Cu, Fe, In, $LaH_3$, Mn, Ru, Sb, Sn, $TiH_2$, TiO, and Zn. Such materials are taught in U.S. Pat. No. 5,348,822.

Suitable cathode materials may comprise a disordered multi-phase nickel hydroxide matrix including at least one modifier, for example 3 modifiers, chosen from F, Li, Na, K, Mg, Ba, Ln, Se, Nd, Pr, Y, Co, Zn, Al, Cr, Mn, Fe, Cu, Zn, Sc, Sn, Sb, Te, Bi, Ru and Pb. Suitable cathode materials are taught for example in U.S. Pat. No. 5,637,423.

Cathode materials may comprise nickel hydroxide modified with one or more group II elements and Co in a solid solution state. Such materials are taught in U.S. Pat. No. 5,366,831.

The cathode active materials may comprise nickel hydroxide and one or more components selected from the group consisting of cobalt, cobalt hydroxide and cobalt oxide and a carbon powder. The cathode materials may further comprise a compound of Ca, Sr, Ba, Cu, Ag or Y, for example $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, BaO, $Cu_2O$, $Ag_2O$, $Y_2(CO_3)_3$ or $Y_2O_3$. Suitable cathode materials are taught for instance in U.S. Pat. No. 5,451,475.

Cathode active materials may comprise a metal oxide and one or more of Co, Ca, Ag, Mn, Zn, V, Sb, Cd, Y, Sr, Ba and oxides of Ca, Sr, Ba, Sb, Y or Zn. The metal oxide is for example nickel oxide and or manganese oxide. Such active materials are taught in U.S. Pat. No. 5,455,125.

The cathode materials may contain nickel hydroxide and a further component selected from the group consisting of Y, In, Sb, Ba and Be and Co and/or Ca. Such materials are disclosed in U.S. Pat. No. 5,466,543.

Cathode materials may be prepared by reacting nickel sulfate and ammonium hydroxide to form a nickel ammonium complex; the complex is then reacted with sodium hydroxide to form nickel hydroxide. The method may provide nickel hydroxide comprising one or more of Co, Zn and Cd. These materials are taught in U.S. Pat. No. 5,498,403.

Cathode active materials may comprise nickel hydroxide and cobalt oxyhydroxide as taught in U.S. Pat. No. 5,489,314.

Cathode materials may comprise nickel hydroxide, cobalt monoxide and elemental zinc as taught in U.S. Pat. No. 5,506,070.

The cathode materials may comprise nickel hydroxide, nickel powder, a second powder and at least one of cobalt, cobalt hydroxide and cobalt oxide. The second powder contains one or more of Ca, Sr, Ba, Cu, Ag and Y. Such materials are taught in U.S. Pat. No. 5,571,636.

The cathode active materials may comprise particles of nickel hydroxide or manganese hydroxide having at least partially embedded therein a conductive material. The conductive material may be for instance nickel, nickel alloys, copper, copper alloys; metal oxides, nitrides, carbides, silicides or borides; or carbon (graphite). These materials are disclosed in U.S. Pat. No. 6,177,213.

The cathode materials may comprise nickel hydroxide particles containing at least three modifiers selected from the group consisting of Al, Bi, Ca, Co, Cr, Cu, Fe, In, La, rare earths, Mg, Mn, Ru, Sb, Sn, Ti, Ba, Si, Sr and Zn. For example, nickel hydroxide particles may contain at least four modifiers, for instance, Ca, Co, Mg and Zn. Such materials are disclosed in U.S. Pat. No. 6,228,535.

The positive electrode for instance comprises nickel hydroxide and a carbon material such as graphite. The positive electrode may also comprise a polymeric binder. The polymeric binder is for example a thermoplastic organic polymer, for instance selected from the group consisting of polyvinyl alcohol (PVA), polyethylene oxide, polypropylene oxide, polybutylene oxide, methyl cellulose, carboxymethyl cellulose, hydroxyethyl cellulose, hydroxypropyl cellulose, hydroxypropylmethyl cellulose, polyethylene, polypropylene, polyisobutylene, polyvinyl chloride, polyvinyliden chloride, polyvinyliden fluoride, polytetrafluoroethylene (PTFE), fluorinated ethylene propylene (FEP), perfluroalkoxy (PFA), polyvinylacetate, polyvinyl isobutylether, polyacrylonitrile, polymethacrylonitrile, polymethylmethacrylate, polymethylacrylate, polyethylmethacrylate, allyl acetate, polystyrene, polybutadiene, polyisoprene, polyoxymethylene, polyoxyethylene, polycyclic thioether, polydimethylsiloxane, polyesters such as polyethylene terephthalate, polycarbonate and polyamide. Blends and copolymers of the above are also suitable. The polymeric binder may also be an elastomer or rubber such as styrene-butadiene copolymer, styrene-butadiene-styrene block copolymer, styrene-isoprene block copolymer, styrene-isoprene-styrene block copolymer, styrene-ethylene-styrene-butadiene block copolymer, styrene-ethylene-butadiene-styrene block copolymer or styrene-acrylonitrile-butadiene-methyl acrylate copolymer. Suitable active materials are taught for instance in U.S. Pat. No. 6,617,072.

The cathode active material may contain nickel hydroxide and nickel oxyhydroxide as taught in U.S. Pat. No. 7,396,379.

Generally, cathode active material particles are formed in a sintered or pasted electrode. The pasted electrode may be made by mixing the material with various additives and/or binders and applying the paste to a conductive support. Preferably, one or more cobalt additives are added to the pasted electrode. The cobalt additives may include Co and/or CoO to enhance conductivity, improve utilization and reduce electrical resistance of the positive electrode.

In general, cathode active materials are nickel hydroxide or modified nickel hydroxide. Modified nickel hydroxide may contain one or more modifiers such as Co, Cd, Ag, V, Sb, Ca, Mg, Al, Bi, Cr, Cu, Fe, In, rare earths, Mn, Ru, Sn, Ti, Ba, Si, Sr or Zn. A suitable modified nickel hydroxide is $(Ni,Co,Zn)(OH)_2$, for instance in the form of a spherical powder. In modified nickel hydroxides, nickel generally is present at a level of $\geq 80$ atomic percent, for instance $\geq 90$ atomic percent, based on the metals.

For example, the MH battery comprises at least one negative electrode which comprises an ABx type alloy capable of reversibly storing hydrogen and comprises as least one positive electrode comprising nickel hydroxide or modified nickel hydroxide active materials.

A separator may be present which separates the negative electrodes from the positive electrodes. The separator is for instance a nonwoven web of natural or synthetic fibers. Natural fibers include cotton. Synthetic fibers include polyamide, polyester, polypropylene (PP), polyethylene (PE), PP/PE copolymer, polytetrafluoroethlene (PTFE), polyvinylchloride and glass.

Halide and oxyacid salts are for example alkali metal halide salts and alkali metal oxyacid salts.

Halides are $F^-$, $Cl^-$, $Br^-$ and $I^-$.

Oxyacid anions are anions of oxacids, for instance anions of sulfuric acid, nitric acid, phosphoric acid, carbonic acid, periodic acid, acetic acid, formic acid, tungstic acid and the like.

An oxyacid is any oxygen-containing protic acid.

The salts for instance contain anions selected from the group consisting of $F^-$, $Cl^-$, $Br^-$, $I^-$, $CO_3^{-2}$, $NO_3^-$, $PO_4^{-3}$, $SO_4^{-2}$, $IO_4^-$, $WO_4^{-2}$, $C_2H_3O_2^-$ and $CHO_2^-$.

Alkali metal ions include $Li^+$, $Na^+$, $K^+$, $Rb^+$ and $Cs^+$.

Suitable alkali metal salts include LiF, LiCl, LiBr, LiI, $Li_2CO_3$, $LiNO_3$, $Li_3PO_4$, $Li_2SO_4$, NaF, NaCl, NaBr, NaI, $Na_2CO_3$, $NaNO_3$, $Na_3PO_4$, $Na_2SO_4$, $Na_2WO_4$, $NaC_2H_3O_2$, $NaCHO_2$, KF, KCl, KBr, KI, $K_2CO_3$, $KNO_3$, $K_3PO_4$, $K_2SO_4$, $KIO_4$, $KC_2H_3O_2$, $KCHO_2$, RbF, RbCl, RbBr, RbI, $Rb_2CO_3$, $RbNO_3$, $Rb_3PO_4$, $Rb_2SO_4$, CsF, CsCl, CsBr, CsI, $Cs_2CO_3$, $CsNO_3$, $Cs_3PO_4$ and $Cs_2SO_4$.

The molar concentration of KOH in the aqueous solution may be from about 3 M (molar) to about 8 M, from about 4 M to about 7 M, from about 5 M to about 7 M or from about 6 M to about 7 M.

The molar concentration of the one or more salts in the aqueous solution is advantageously from about 0.2 M to about 3.0 M, from about 0.3 M to about 2.5 M or from about 0.4 M to about 2.0 M; or about 0.5, about 0.6, about 0.7, about 0.8, about 0.9 about 1.0, about 1.1, about 1.2, about 1.3, about 1.4, about 1.5, about 1.6, about 1.7, about 1.8 or about 1.9 M.

The degradation of the anode material in the battery is advantageously ≤98%, ≤95%, ≤90%, ≤85% or ≤80% of the degradation of the same anode material in the same battery when replacing the electrolyte composition with 30 wt % aqueous KOH.

Advantageously, the degradation of the anode material in the battery is ≤70%, ≤60%, ≤50%, ≤40% or ≤30% of the degradation of the same anode material in the same battery when replacing the electrolyte composition with 30 wt % aqueous KOH.

The conductivity of the electrolyte composition is advantageously ≥87%, ≥89%, ≥91% ≥93% or ≥95% of that of 30 wt % aqueous KOH.

Degradation is measured for instance via cycle stability of the anode material under operating conditions in a flooded cell. A typical battery cell may be prepared as described in the working Examples. The cell is charged at a current density of 100 mA/g for 5 hours and discharged at a current density of 100 mA/g until a cut-off voltage of 0.9 V is reached, discharged at a current density of 24 mA/g until a cut-off voltage of 0.9 V is reached and finally discharged at a current density of 8 mA/g until a cut-off voltage of 0.9 V is reached. The full discharge capacity is the sum of capacities measured at 100, 24 and 8 mA/g for each cycle.

Degradation is determined after a certain number of cycles, for instance after 5, 6, 7, 8, 9 or 10 cycles. Degradation is defined as percent capacity loss per cycle.

Percent capacity loss per cycle is:

$$\frac{cap_{high} - cap_{low}}{(\eta_{low} - \eta_{high}) \cdot cap_{high}} \cdot 100,$$

where
$cap_{high}$ is the highest value of discharge capacity,
$cap_{low}$ is the lowest value of discharge capacity,
$\eta_{high}$ is the cycle number of the highest discharge capacity and
$\eta_{low}$ is the cycle number of the lowest discharge capacity.

The ratio of percent capacity loss per cycle when employing an anode material in a flooded cell with a present electrolyte composition to that in a flooded cell with 30 wt % KOH electrolyte, multiplied by 100, provides the relative degradation percent of the embodiments and claims.

For example, $cap_{high}$ discharge capacity of an anode material is determined to be 400 mA/g after 1 cycle in a present electrolyte composition. After 10 cycles operation in a present electrolyte composition, $cap_{low}$ is determined to be 350 mA/g. The percent capacity loss per cycle is (400−350)/(9·400)·100=1.39%.

When employing the same anode material in the same flooded cell, replacing the electrolyte composition with 30 wt % KOH, the discharge capacity is determined to be 400 mA/g after 1 cycle and 200 mA/g after 10 cycles. The percent capacity loss per cycle is (400−200)/(9·400)·100=5.56%.

In this example, the degradation of the anode material in the flooded cell with a present electrolyte composition is 25% of that of the same anode material in the same flooded cell but with 30 wt % KOH as the electrolyte ((1.39/5.56)·100).

Capacities are suitably measured with an Arbin Instruments Battery Test System or with a Maccor Instruments Battery Test System.

Conductivity is measured with any suitable conductivity device, for example a YSI model 3200 conductivity meter or a digital conductivity meter with a probe produced by TRACEABLE VWR Inc.

All measurements herein, for example degradation, conductivity and concentrations are determined at 25° C. and atmospheric pressure.

The terms "a" or "an" referring to elements of an embodiment may mean "one" or may mean "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

The term "consisting essentially of" means that the composition, method or structure may include additional ingredients, steps and/or parts, but only if the additional ingredients, steps and/or parts do not materially alter the basic and novel characteristics of the claimed composition, method or structure.

U.S. patents, U.S. published patent applications and U.S. patent applications discussed herein are each hereby incorporated by reference.

Following are some embodiments of the invention.

E1. A metal hydride battery comprising at least one negative electrode comprising an active anode material, at least one positive electrode comprising an active cathode material, a casing having said electrodes positioned therein and an electrolyte composition, where
the electrolyte composition comprises an aqueous solution comprising KOH and one or more salts selected from the group consisting of halide salts and oxyacid salts.

E2. A battery according to embodiment 1 where the anode material comprises an ABx hydrogen storage alloy where x is from about 0.5 to about 5.

E3. A battery according to embodiments 1 or 2 where the anode material has a discharge capacity of ≥400 mAh/g, ≥425 mAh/g, ≥450 mAh/g or ≥475 mAh/g.

E4. A battery according to any of embodiments 1 to 3 where the anode material comprises Mg, for example ≥20 at % Mg.

E5. A battery according to any of the preceding embodiments where the anode material comprises Mg and Ni in an atomic ratio of from about 1:2 to about 2:1.

E6. A battery according to embodiment 5 where the anode material further comprises one or more modifying elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca.

E7. A battery according to embodiment 6 where the one or more modifying elements are present from about 0.1 to about 30 at % or from about 0.25 to about 15 at % or from about 0.5, about 1, about 2, about 3, about 4 or about 5 at % to about 15 at %, based on the total alloy.

E8. A battery according to any of the preceding embodiments where the anode material comprises Mg and Ni where the atomic ratio of Mg to Ni is about 1:1.

E9. A battery according to any of embodiments 1 to 7 where the anode material is $Mg_{52}Ni_{39}Co_6Mn_3$ or $Mg_{52}Ni_{39}Co_3Mn_6$.

E10. A battery according to any of embodiments 1 to 9 where the electrolyte composition comprises halide salts.

E11. A battery according to any of embodiments 1 to 9 where the electrolyte composition comprises oxyacid salts.

E12. A battery according to any of the preceding embodiments where the one or more salts are alkali metal salts.

E13. A battery according to any of the preceding embodiments where the salts contain anions selected from the group consisting of $F^-$, $Cl^-$, $Br^-$, $I^-$, $CO_3^{-2}$, $NO_3^-$, $PO_4^{-3}$, $SO_4^{-2}$, $IO_4^-$, $WO_4^{-2}$, $C_2H_3O_2^-$ and $CHO_2^-$.

E14. A battery according to any of the preceding embodiments where the electrolyte composition comprises one or more salts selected from the group consisting of LiF, LiCl, LiBr, LiI, $Li_2CO_3$, $LiNO_3$, $Li_3PO_4$, $Li_2SO_4$, NaF, NaCl, NaBr, NaI, $Na_2CO_3$, $NaNO_3$, $Na_3PO_4$, $Na_2SO_4$, $Na_2WO_4$, $NaC_2H_3O_2$, $NaCHO_2$, KF, KCl, KBr, KI, $K_2CO_3$, $KNO_3$, $K_3PO_4$, $K_2SO_4$, $KIO_4$, $KC_2H_3O_2$, $KCHO_2$, RbF, RbCl, RbBr, RbI, $Rb_2CO_3$, $RbNO_3$, $Rb_3PO_4$, $Rb_2SO_4$, CsF, CsCl, CsBr, CsI, $Cs_2CO_3$, $CsNO_3$, $Cs_3PO_4$ and $Cs_2SO_4$.

E15. A battery according to any of the preceding embodiments where the electrolyte composition comprises one or more salts selected from the group consisting of NaCl, KCl, RbCl, CsCl, KF, NaBr and KBr.

E16. A battery according to any of the preceding embodiments where the electrolyte composition comprises one or more salts selected from the group consisting of NaCl, KCl and RbCl.

E17. A battery according to any of the preceding embodiments where the concentration of KOH in the aqueous solution is from about 3 M to about 8 M, from about 4 M to about 7 M, from about 5 M to about 7 M or from about 6 M to about 7 M.

E18. A battery according to any of the preceding embodiments where the concentration of the one or more salts in the aqueous solution is from about 0.2 M to about 3.0 M, from about 0.3 M to about 2.5 M or from about 0.4 M to about 2.0 M.

E19. A battery according to any of the preceding embodiments where the concentration of the one or more salts in the aqueous solution is about 0.5 M, about 0.6 M, about 0.7 M, about 0.8 M, about 0.9 M about 1.0 M, about 1.1 M, about 1.2 M, about 1.3 M, about 1.4 M, about 1.5 M, about 1.6 M, about 1.7 M, about 1.8 M or about 1.9 M.

E20. A battery according to any of the preceding embodiments where the degradation of the anode material in the battery is <100%, ≤98%, ≤95%, ≤90%, ≤85%, ≤80%≤70%, ≤60%, ≤50%, ≤40% or ≤30% of the degradation of the same anode material in the same battery when replacing the electrolyte composition with 30 wt % aqueous KOH.

E21. A battery according to any of the preceding embodiments where the conductivity of the electrolyte composition is ≥85%, ≥87%, ≥89%, ≥91%≥93% or ≥95% of that of 30 wt % aqueous KOH.

EXAMPLES

About 70 mg of $Mg_{52}Ni_{39}Co_6Mn_3$ metal hydride alloy powder prepared by melt-spin and mechanical alloying is compacted onto an expanded nickel substrate with a 10-ton press to form the negative working electrode, approximately 0.2 mm thick, without any binder. An aqueous solution of one or more alkali metal salts and KOH is employed as the electrolyte. Two halves of sintered $Ni(OH)_2$ positive electrode, each 1 $cm^2$ in area and 1.5 mm in thickness, are connected by a nickel tab strip and used as the counter electrode.

A piece of grafted polypropylene/polyethylene separator is folded in half twice and sandwiches the negative electrode so that there are two layers of separator on each side thereof. Next, two halves of positive electrode sandwiches the wrapped negative electrode. The electrode assembly is placed into a plastic sleeve, which is then slid into an acrylic cell holder. The sleeve is filled with electrolyte using a pipette. After absorbing for five minutes, the sleeve is filled again with electrolyte so that it is in a flooded cell configuration.

Percent degradation relative to 30 wt % KOH electrolyte is determined as previously described. Degradation is determined after 10 cycles. Percent conductivity relative to 30 wt % KOH electrolyte is also determined. Conductivity is measured with a digital conductivity meter with a probe produced by TRACEABLE VWR Inc. Results are in the table below. The table lists electrolyte compositions with alkali metal salts concentrations in mols/L (M) in water. Each electrolyte composition contains 6.33 M, 5.89 M, 5.44 M or 5.00 M of KOH plus 0.44 M, 0.88 M, 1.33 M or 1.77 M of the salt listed in water, respectively. The total molarity of KOH plus salt is in each solution 6.77. Degradation and conductivity are reported in percent relative to 30 wt % aqueous KOH electrolyte. Low degradation and high conductivity are desired.

| LiCl (M) | degradation | conductivity | NaCl (M) | degradation | conductivity |
|---|---|---|---|---|---|
| 0.44 | 102 | 97.4 | 0.44 | 31.0 | 97.4 |
| 0.88 | 101 | 94.8 | 0.88 | 55.6 | 94.4 |
| 1.33 | 90.0 | 92.3 | 1.33 | 53.4 | 91.9 |
| 1.77 | 87.5 | 89.7 | 1.77 | 26.5 | 89.7 |

| KCl (M) | degradation | conductivity | RbCl (M) | degradation | conductivity |
|---|---|---|---|---|---|
| 0.44 | 100 | 97.0 | 0.44 | 90.9 | 96.3 |
| 0.88 | 98.2 | 96.0 | 0.88 | 99.0 | 96.0 |
| 1.33 | 87.3 | 95.2 | 1.33 | 115 | 95.2 |
| 1.77 | 99.9 | 93.0 | 1.77 | 50.8 | 94.1 |

| CsCl (M) | degradation | conductivity | KF (M) | degradation | conductivity |
|---|---|---|---|---|---|
| 0.44 | 86 | 96.3 | 0.44 | 97.2 | 96.8 |
| 0.88 | 83 | 94.8 | 0.88 | 93.7 | 94.7 |
| 1.33 | 75 | 93.0 | 1.33 | 93.1 | 92.9 |
|  |  |  | 1.77 | 95.0 | 89.7 |

-continued

| KBr (M) | degradation | conductivity | KI (M) | degradation | conductivity |
|---|---|---|---|---|---|
| 0.44 | 96.4 | 104 | 0.44 | 93.6 | 96.1 |
| 0.88 | 95.4 | 102 | 0.88 | 96.0 | 94.3 |
| 1.33 | 93.3 | 103 | 1.33 | 78.3 | 92.9 |
| 1.77 | 92.2 | 93.9 | 1.77 | 89.7 | 91.5 |

| LiBr (M) | degradation | conductivity | NaBr (M) | degradation | conductivity |
|---|---|---|---|---|---|
| 0.44 | 109 | 93.8 | 0.44 | 91.0 | 94.5 |
| 0.88 | 109 | 87.9 | 0.88 | 92.8 | 89.3 |
| 1.33 | 77.3 | 82.2 | 1.33 | 109 | 84.2 |
| 1.77 | 83.2 | 77.0 | 1.77 | 92.6 | 79.6 |

| $KNO_3$ (M) | degradation | conductivity | $K_2CO_3$ (M) | degradation | conductivity |
|---|---|---|---|---|---|
| 0.44 | 62 | 100 | 0.44 | 95.8 | 99.6 |
| 0.88 | 40 | 97 | 0.88 | 93.7 | 97.2 |
| | | | 1.33 | 91.4 | 95.6 |
| | | | 1.77 | 75.0 | 91.7 |

| $K_3PO_4$ (M) | degradation | conductivity |
|---|---|---|
| 0.44 | 95.2 | 99.2 |
| 0.88 | 92.8 | 94.8 |
| 1.33 | 94.2 | 92.5 |
| 1.77 | 92.1 | 88.9 |

In the below table, electrolyte compositions are aqueous solutions of 6.33 M KOH plus 0.44 M of each salt. Percent degradation and conductivity relative to 30 wt % aqueous KOH electrolyte are reported.

| salt | degradation | conductivity |
|---|---|---|
| $Na_2WO_4$ | 88 | 87 |
| $KIO_4$ | 78 | 100 |
| $LiNO_3$ | 67 | 98 |
| $NaNO_3$ | 41 | 98 |
| $RbNO_3$ | 49 | 96 |
| LiBr | 90 | 87 |
| NaBr | 90 | 96 |
| NaF | 89 | 97 |
| $Cs_2CO_3$ | 94 | 97 |
| $Rb_2CO_3$ | 96 | 98 |
| $Na_2CO_3$ | 96 | 89 |

The invention claimed is:

1. A metal hydride battery comprising at least one negative electrode comprising an active anode material, at least one positive electrode comprising an active cathode material, a casing having said electrodes positioned therein and an electrolyte composition;
   wherein the anode material comprises an alloy comprising Mg and Ni in an atomic ratio of from about 1:2 to about 2:1 and one or more modifying elements selected from the group consisting of Co, Mn, Al, Fe, Cu, Mo, W, Cr, V, Ti, Zr, Sn, Th, Si, Zn, Li, Cd, Na, Pb, La, Ce, Pr, Nd, Mm, Pd, Pt, Nb, Sc and Ca, wherein Mg and Ni together are present at a level of ≥70 at % and the one or more modifying elements are present from about 0.1 at % to about 30 at %, based on the total alloy;
   wherein the electrolyte composition comprises an aqueous solution comprising from about 3 M to about 8 M KOH and from 0.4 M to 2.0 M one or more salts selected from the group consisting of NaCl, KCl and RbCl; and
   wherein the degradation of the anode material in the battery is <100 percent of the degradation of the same anode material in the same battery when replacing the electrolyte composition with 30 weight percent aqueous KOH and wherein the conductivity of the electrolyte composition is ≥85 percent of that of 30 weight percent aqueous KOH.

2. A battery according to claim 1 where the anode material comprises an alloy selected from the group consisting of $Mg_{0.8}Ti_{0.2}Ni$, $Mg_{0.7}Ti_{0.3}Ni$, $Mg_{0.9}Ti_{0.1}Ni$, $Mg_{0.8}Zr_{0.2}Ni$, $Mg_{0.7}Ti_{0.225}La_{0.075}Ni$, $Mg_{0.8}Al_{0.2}Ni$, $Mg_{0.9}Ti_{0.1}Ni$, $Mg_{0.9}Ti_{0.1}NiAl_{0.05}$, $Mg_{0.08}Pd_{0.2}Ni$, $Mg_{0.09}Ti_{0.1}NiAl_{0.05}$, $Mg_{0.09}Ti_{0.1}NiAl_{0.05}Pd_{0.1}$, $Mg_{50}Ni_{45}Pd_5$, $Mg_{0.85}Ti_{0.15}Ni_{1.0}$, $Mg_{0.95}Ti_{0.15}Ni_{0.9}$, and $Mg_{2.0}Ni_{0.6}Co_{0.4}$.

3. A battery according to claim 1 where the anode material comprises $Mg_2Ni_{0.6}Mn_{0.4}$, $Mg_2Ni_{0.7}Cu_{0.3}$, $Mg_{0.8}La_{0.2}Ni$, $Mg_{2.0}Co_{0.1}Ni$, $Mg_{2.1}Cr_{0.1}Ni$, $Mg_{2.0}Nb_{0.1}Ni$, $Mg_{2.0}Ti_{0.1}Ni$, $Mg_{2.0}V_{0.1}Ni$, $Mg_{1.3}Al_{0.7}Ni$, $Mg_{1.5}Ti_{0.5}Ni$, $Mg_{1.5}Ti_{0.3}Zr_{0.1}Al_{0.1}Ni$, $Mg_{1.75}Al_{0.25}Ni$, $(MgAl)_2Ni$, or $Mg_{1.70}Al_{0.3}Ni$.

4. A battery according to claim 1 where the anode material has a discharge capacity of ≥400 mAh/g.

5. A battery according to claim 1 where the anode material has a discharge capacity of ≥450 mAh/g.

6. A battery according to claim 1 where the anode material comprises an alloy selected from the group consisting of $Mg_{52}Ni_{39}Co_6Mn_3$ and $Mg_{52}Ni_{39}Co_3Mn_6$.

7. A battery according to claim 1, wherein the degradation of the anode material in the battery is ≤95 percent of the degradation of the same anode material in the same battery when replacing the electrolyte composition with 30 wt percent aqueous KOH and wherein the conductivity of the electrolyte composition is ≥87 percent of that of 30 wt percent aqueous KOH.

8. A battery according to claim 1, wherein the one or more modifying elements are Co and/or Mn.

* * * * *